Patented Aug. 21, 1928.

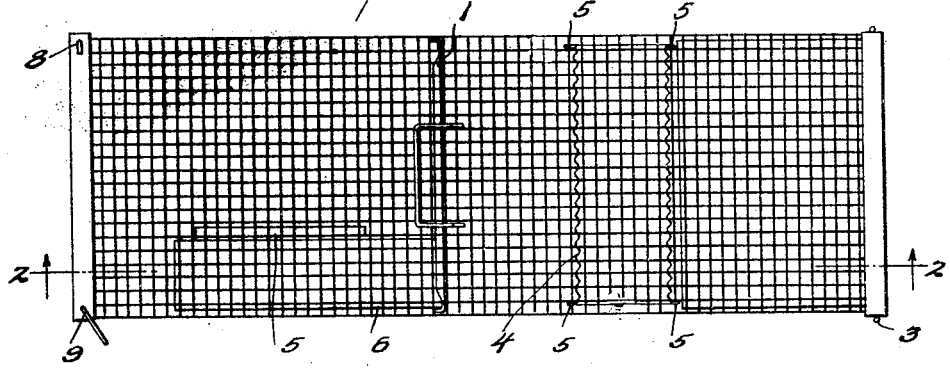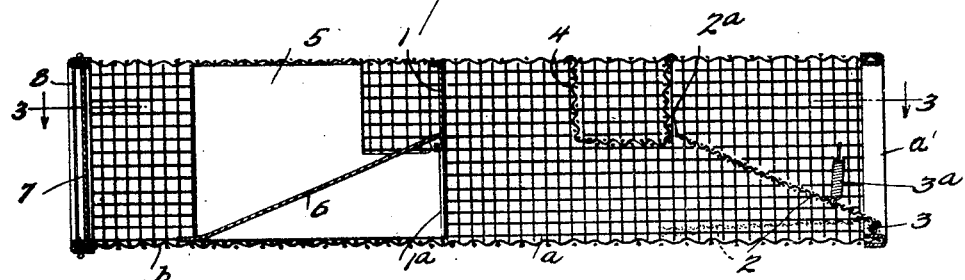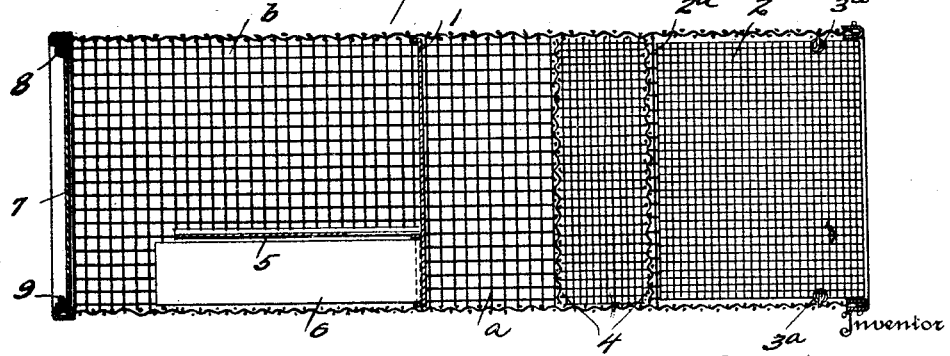

1,681,804

UNITED STATES PATENT OFFICE.

BENJAMIN F. HATCHELL, OF CROCKETT, TEXAS.

ANIMAL TRAP.

Application filed June 21, 1927. Serial No. 200,417.

This invention relates to traps for catching rats and other small animals. In carrying out the invention, I provide an oblong body composed of wire netting and having a transverse partition dividing it into entrance and prison compartments, the partition having an opening to permit the animal to pass from the former to the latter compartment, and having means for preventing the return of the animal to the entrance compartment. The entrance compartment is provided with an open doorway at one end, and a door is hinged at one end in the lower part of the doorway and extends inwardly in the entrance compartment. This door is held in an upwardly inclined position by relatively light springs which yield under the weight of the animal and permit the door to swing down on to the floor of the trap. A bait container is suspended from the top of the trap and forms a partition which extends across the upper portion of the entrance compartment. The free end of the door normally extends close to the front side of the container, at or above the bottom thereof. The arrangement is such that the animal, in seeking the bait, will depress the door and when the animal has passed over the door the latter will swing up in front of the bottom of the container, and the container and door will prevent the return of the animal. The bait container may readily be inserted and removed through the open doorway by depressing the door with the hand.

In the accompanying drawing,

Fig. 1 is a top plan view of the trap;

Fig. 2 is a section on the line 2—2 of Fig. 1; and,

Fig. 3 is a section on the line 3—3 of Fig. 2.

Referring to the drawing, the trap comprises an oblong rectangular wire body having a transverse partition 1, about midway of its length, which divides the trap into an entrance compartment $a$ and a prison compartment $b$. The entrance compartment has an open doorway $a'$, in the lower part of which a wire door 2 is hingedly mounted upon a wire 3, which is pivoted in the sides of the doorway. This door extends into the trap and is yieldingly suspended in inclined position by light springs $3^a$. A bait box or container 4 is suspended from the top of the trap adjacent the inner end of the door. As shown, this container is composed of a strip of wire netting bent into the form of a trough and having hooks 5, at its edges, by which it may be detachably connected to the top of the trap. The bait container extends from side to side of the trap and forms a partition across the upper portion of the entrance compartment and spaced from the bottom of the trap. The end $2^a$ of the entrance door normally extends close to the bait container and slightly above the bottom thereof, as shown in Fig. 2 of the drawing. The length of the door from the edge $2^a$ to the hinge-wire 3 is greater than the height of the doorway so that the door cannot swing outwardly through the doorway, but will swing against the top of the trap if pushed outwardly. The end $2^a$ of the door clears the lower adjacent corner of the bait container so that the door may swing downwardly into the dotted line position shown in Fig. 2.

With this construction, when an animal, such as a rat, attracted by the bait, enters the doorway, its weight upon the door 2 depresses the latter to the horizontal position against the bottom of the trap and this permits the animal to pass under and behind the bait container, which the animal will naturally do in trying to get the bait, but as soon as the animal steps off of the door, the latter springs up in front of the bait container and the animal is then imprisoned by the container and door. Any effort of the animal to return through the doorway will simply result in rocking the door until its free end $2^a$ abuts against the top of the trap.

A partition 5 extends at right angles to the partition 1 in the prison compartment, at one side of the center thereof, and the partition 1 has an opening $1^a$ in one end, between said partition 5 and the adjacent wall of the trap. A door 6 is hinged to the wall 1 above said opening and inclines downwardly to the bottom of the prison compartment, as shown. The animal, seeking exit from the entrance compartment, will pass through the opening $1^a$, lifting the door 6, and when it has entered the prison compartment, the door 6 falls downwardly and prevents the return of the animal to the entrance compartment.

In order to remove the animal from the prison compartment, the outer end of said compartment is provided with a door 7 hinged at one side of the trap upon a pin 8, and a removable locking pin 9 at the other side of the trap normally locks the door in closed position. By removing the pin 9, the door may be swung about the hinge-pin to release the animal.

As the doorway $a'$ is open and the door 2 is easily depressed and swings inwardly and downwardly, the hand may be readily inserted into the trap to remove or replace the bait container.

What I claim is:

An animal trap comprising an oblong wire body having a transverse partition dividing it into an entrance compartment and a prison compartment, means permitting an animal to pass from the former to the latter compartment and for preventing its return, said entrance compartment having an open doorway, a bait container extending centrally across the upper part of the entrance compartment and spaced from the bottom of the trap and from said doorway, a door hinged at one of its ends near the bottom of the doorway and having its free end adapted to swing from a position in front of said container downwardly against the bottom of the trap, and a spring yieldingly supporting said door in inclined position with its free end in front of the bait container.

In testimony whereof I hereunto affix my signature.

BENJAMIN F. HATCHELL.